United States Patent [19]

Oudenhoven et al.

[11] Patent Number: 4,682,728

[45] Date of Patent: Jul. 28, 1987

[54] METHOD AND APPARATUS FOR CONTROLLING THE TEMPERATURE AND FLOW RATE OF A FLUID

[76] Inventors: Martin S. Oudenhoven, 9436 W. Wesley Ave., Lakewood, Colo. 80227; Frank Ruskey, 3510 Lee St., Wheatridge, Colo. 80033

[21] Appl. No.: 769,890

[22] Filed: Aug. 27, 1985

[51] Int. Cl.⁴ .......................................... G05D 23/185
[52] U.S. Cl. ............................. 236/12.12; 137/637.3;
236/78 C; 364/510
[58] Field of Search ............... 364/510; 236/94, 12.11,
236/12.12, 78.0, 12.17, 12.1, 12.18; 137/637.3,
625.41

[56] References Cited

U.S. PATENT DOCUMENTS

| | | | |
|---|---|---|---|
| 3,409,042 | 11/1968 | Anthony | 137/603 |
| 3,533,444 | 10/1970 | Lyon | 137/625.17 |
| 3,957,081 | 5/1976 | Dewavrin et al. | 137/625.4 |
| 4,286,615 | 9/1981 | Stumpp et al. | 137/554 X |
| 4,322,031 | 3/1982 | Gehlert | 236/12.1 |
| 4,328,830 | 5/1982 | Greer | 137/625.4 |
| 4,328,831 | 5/1982 | Wolff | 137/625.31 |
| 4,420,811 | 12/1983 | Tarnay et al. | 364/510 |
| 4,421,269 | 12/1983 | Ts'ao | 236/12.12 |
| 4,422,619 | 12/1983 | Griffiths | 251/130 |
| 4,456,031 | 6/1984 | Taplin | 137/625.62 |

Primary Examiner—William E. Wayner
Attorney, Agent, or Firm—Schwartz, Jeffery, Schwaab, Mack, Blumenthal & Evans

[57] ABSTRACT

A method and apparatus for controlling the mixing of two fluids to form a mixed fluid, and the volume discharge rate of the mixed fluid. In a particular application, the two fluids are hot and cold water, and the mixing is controlled to effect temperature control of the mixed water. A specially-designed integral temperature control and volume control valve is included as part of the system. Operation of the valve is controlled by two stepper motors, which in turn are controlled by signals developed by a control unit. Means for setting a desired temperature and volume rate discharge, as well as means for displaying the set temperature and volume rate discharge, are also provided.

8 Claims, 13 Drawing Figures

METHOD AND APPARATUS FOR CONTROLLING THE TEMPERATURE AND FLOW RATE OF A FLUID

BACKGROUND OF THE INVENTION

1. Field of the Invention

This invention pertains to a method and apparatus for automatically adjusting a fluid flow to have a predetermined temperature and volume flow rate, especially in applications involving residential and commercial plumbing installations such as shower and sink basin water control units.

2. Description of the Prior Art

Many methods and apparatus for the mixing and control of fluids are known. The device with which people most often come in contact is the conventional faucet or shower arrangement, wherein the temperature and volume flow rate of the effluent water are controlled through independent, manual adjustment of knobs mechanically coupled to ball valves in the hot water line and cold water line, respectively. The procedure of turning on both valves, adjusting for a desired volume flow rate, holding one's hand in the stream to sense temperature, and readjusting the knobs to obtain a desired temperature while maintaining the desired volume is so often carried out as to become reflexive. Nevertheless, the procedure can be time consuming, and a scalded hand as a result of water which is initially too hot or which is unintentionally adjusted to become too hot can be a major annoyance if not an outright hazard.

Moreover, swings in temperature due to additional demands on the water system are a familiar occurrence. In the past, however, it has been necessary simply to tolerate these changes in temperature, or to continually manipulate the hot and cold water knobs to compensate for these undesirable changes.

SUMMARY OF THE INVENTION

The present invention is a method and apparatus for automatically controlling volume flow rate and temperature to predetermined settings. Thereafter, the system functions to maintain at least the temperature at its predetermined setting. The user, however, has the option of varying both settings at any time during the course, for example, of a shower. At the same time, the system provides the user with a range of information such as the current settings of temperature and volume flow rate, and whether the actual temperature as measured by a sensor included in the system matches the set temperature. Once a user has customized the settings to his or her individual preference, the system includes provision for permitting the user to store those settings so that they may be immediately summoned into operation the next time that particular user wishes to do so.

System control is implemented efficaciously by a specially-designed control valve. This control valve need have only three ports, a cold water port, a hot water port, and an outlet port. Water temperature is controlled by a rotary valve element disposed near the hot and cold water ports which controls the volume ratio of hot to cold water admitted to a mixing chamber. Volume flow rate is controlled by another rotating valve element disposed near the outlet port. The angular position of each of these rotating valve elements is controlled by a separate stepper motor. The above-mentioned temperature sensor is incorporated into the valve near the water outlet port.

While the foregoing summary, and the detailed description which follows, describe the invention in terms of a domestic plumbing facility, it should be understood and kept in mind that the system according to the present invention has many applications ranging far beyond domestic use. Indeed, it will become apparent to one of ordinary skill in the art that the present invention will prove useful in any setting where it is desired to control the mixing of two fluids and the volume flow rate of the resultant mixed fluid.

BRIEF DESCRIPTION OF THE DRAWINGS

The features and advantages of the system according to the present invention will become apparent from the following description thereof taken in conjunction with the drawings in which.

DETAILED DESCRIPTION OF THE PREFERRED EMBODIMENTS

As mentioned above, the invention will now be described using, as an example, a domestic shower system. It will be understood by one of ordinary skill in the art, however, that this description is exemplary only. It is not contemplated that the usefulness of the present invention will be limited to domestic shower systems, and the invention should not be regarded as being so limited.

Figure 1:
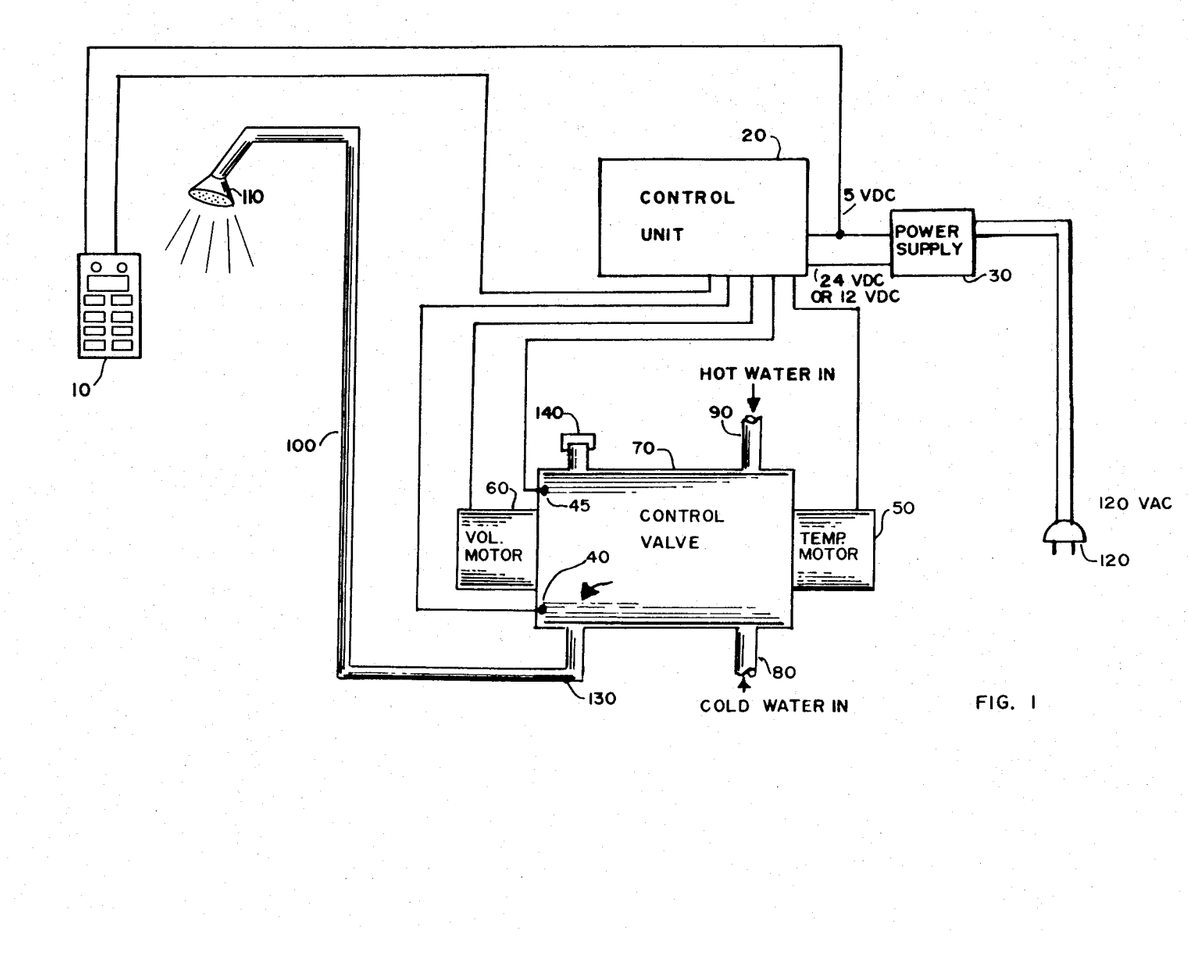
FIG. 1 is a partially schematic diagram of one embodiment of a system according to the present invention.

In the application shown in FIG. 1, the system includes data entry means in the form of a keypad/display unit 10. Keypad 10 is connected to exchange data with a control unit 20. Control unit 20 and keypad 10 are arranged to receive operational power (in the embodiment described, 5 volts DC) from a power supply 30. Power supply 30 also provides operational power for two stepper motors described below. This voltage can be a standard voltage such as 12 or 24 volts DC. In the preferred embodiment, power supply 30 includes an auxiliary power source such as batteries maintaining supply of 5 volt operational power despite an interruption in the line voltage, in the disclosed embodiment, 24 volts DC. Power supply 30 derives the operational power from a conventional 120 volt AC line source, shown in FIG. 1 as line source 120. Details of construction of power supply 30 will be apparent to one of ordinary skill in circuit design. It may include, for example, a step-down transformer, a rectifier, and voltage regulators. All of these components are commercially available. For example, the step-down transformer may be one such as is available from Basler Electric Company and Iriichi-Tsushin Kugo.

Control unit 120 is also electrically connected to temperature sensing means in the form of a resistance temperature device (RTD), thermocouple, or thermistor 40. Thermistor 40 is disposed on the body of a control valve 70. Also disposed on the body of the control valve 70 are a temperature stepper motor 50 and a volume rate stepper motor 60. These motors are, in turn, both electrically connected to control unit 20. Temperature stepper motor 50 is disposed adjacent a cold water port 80 and hot water port 90 of control valve 70. Volume rate stepper motor 60 is disposed adjacent a water outlet port 130. The control valve may also include an auxiliary outlet port 140. This auxiliary port 140 may have an associated temperature sensing means or thermistor, designated with the numeral 45 in FIG. 1.

The second unit 20 is used to control the valve positions by instructions entered manually through keypad 10. Signals from the control unit to temperature stepper motor 50 and fluid volume rate stepper motor 60 control the valve positions and consequently passage of cold water from cold water port 80 and hot water from hot water port 90 through the control valve 70. The volume rate of water emerging from outlet port 130 is that quantity selected by the operation from the keypad.

The water temperature T sensed by temperature sensing means 40 is compared to a set temperature $T_0$ stored in memory in control unit 20. A feedback system signals continuous adjustments to the temperature stepper motor 50 until the selected temperature is attained. If the water is to flow ultimately from a shower head, the water passes along conduit 100 from water outlet port 130 and out shower head 110.

Figure 2:
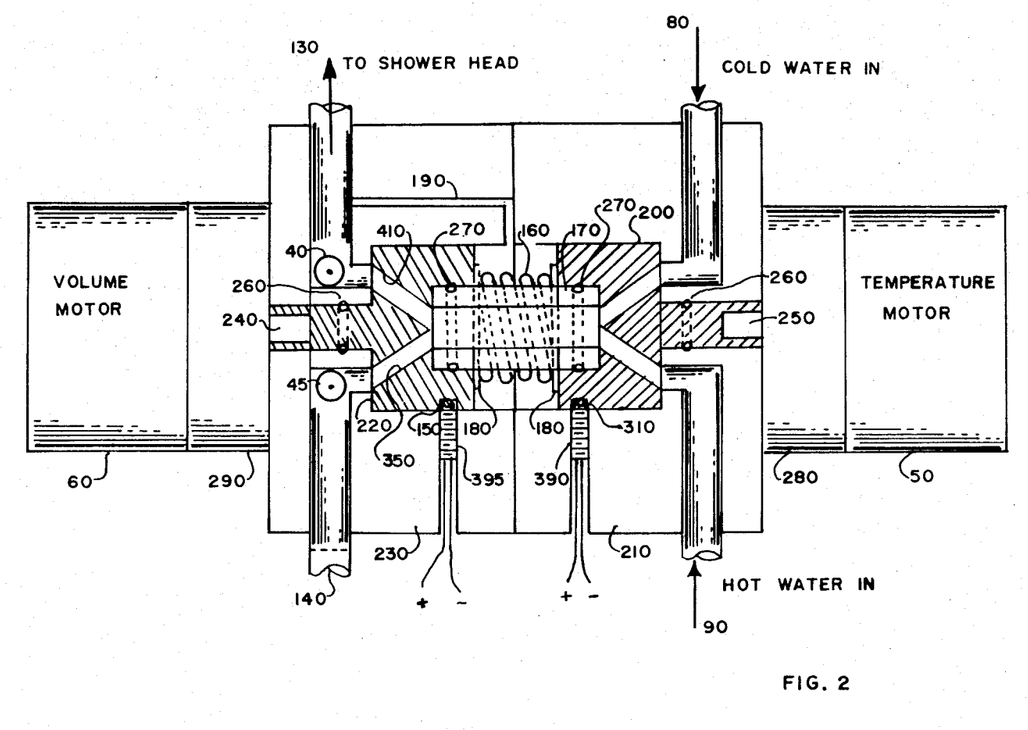
FIG. 2 is a side section of a control valve with motors according to the present invention.
Figure 2A:
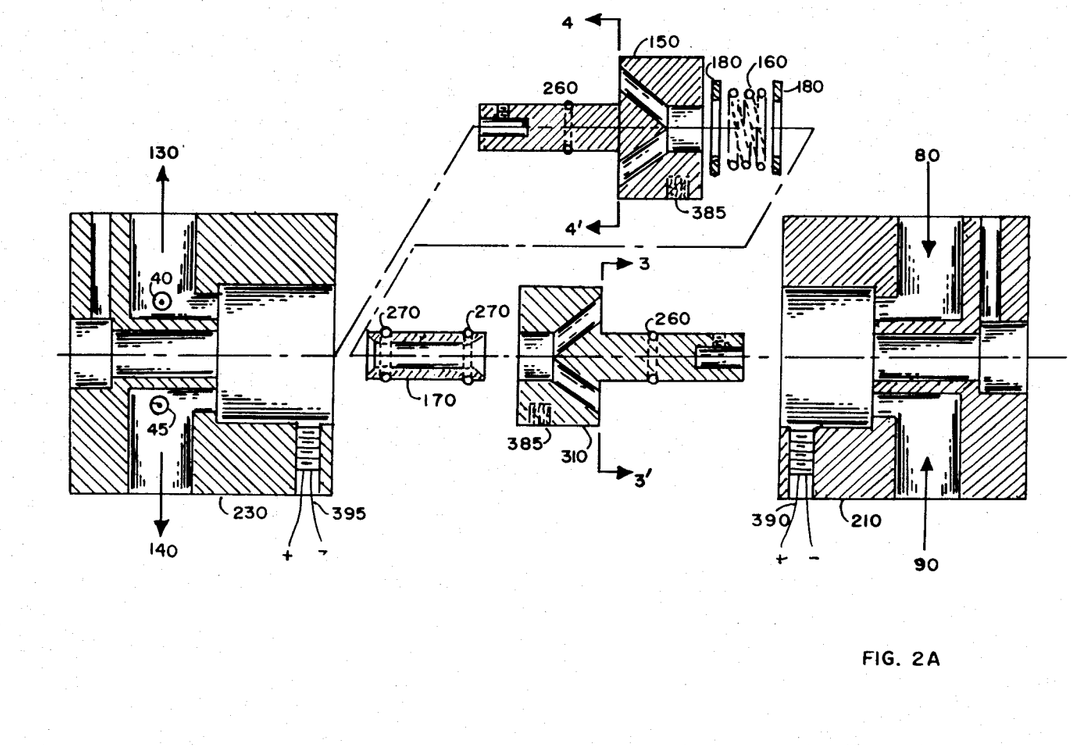
FIG. 2A is an exploded sectional view of the control valve illustrated in FIG. 2.

FIGS. 2 and 2A show components for one embodiment of a valve to be used in a system according to the present invention. Cold water port 80 and hot water port 90 feed water past a temperature valve seat 200 in the temperature valve housing 210. Temperature valve seat 200 in conjunction with temperature valve 310 meter the hot and cold water. That is, the volume ratio of hot water to cold water is varied according to the angular position of valve 310 with respect to the temperature valve seat 200 in a fashion which will become clearer below. The metered hot and cold water continues through temperature valve 310 and starts mixing at the junction of two conduits toward the center of the valve. At the junction, waters enters a connecting tube 170 extending between the temperature valve 310 and the volume valve 150. Mixing is conducted by water movement through the conduit and by convection of the hot and cold water. This mixing process continues throughout the length of the tube. Upon passing through the connecting tube 170 the water enters the volume valve 150. This volume valve has a geometry identical to that of the temperature valve 310 and serves to control the water volume rate as it passes through valve seat 220 and through either of outlet ports 130 or auxiliary outlet port 140 in volume valve housing 230. The primary water outlet port, port 130, is contemplated to be for an application such as shower 110. The auxiliary exit port 140, shown capped in FIG. 1, may be for a tub faucet outlet if such an option is desired.

In water conduits just downstream of the volume control valve seat 220, thermistors 40 and 45 are located, one each for the primary conduit and auxiliary conduit, respectively. The sensors are preferably installed in the volume valve housing, with each entering the housing perpendicular to the flow in its respective conduit. The water passes around the temperature sensors, and continues through the volume valve housing 230 and exits through the tub nozzle or shower nozzle.

Valves 310 and 150 are rotated by gear boxes 280 and 290 driven by stepper motors 50 and 60, respectively. Temperature-control gear box 280 and volume rate-control gear box 290 drive the valves 310 and 150 by shafts 250 and 240, respectively. The valves 310 and 150 are held against their respective seats by a single coiled compression spring 160 that fits around the connecting tube 170. At both ends of the spring 160 are thin flat washers 180 that serve as bearing surfaces for the spring ends. "O" rings 270 are placed on both ends of the connecting tube 170 as water seals. "O" rings 260 are placed on the valve shafts to prevent leakage of water down the shaft past the valve seat. As a precaution against water leaks past the circumference of both valves, a drain conduit 190 may be provided from the spring cavity through the volume valve housing 230 to empty into exit port 130.

Motors such as stepper motors 50 and 60, and the associated gear boxes 280 and 290, are well known per se, and commercially available. For example, the suitable stepping motors are obtainable from Nippon Pulse Motor Corp., Part No. PF 42-48.

Figure 3:
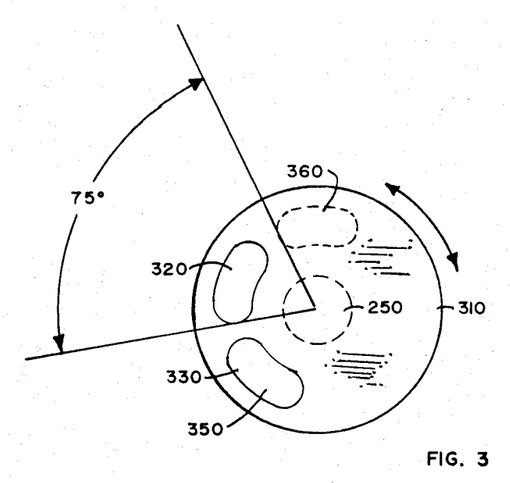
FIG. 3 illustrates temperature valve and seat configurations of the control valve illustrated in FIG. 2 in a view taken along line 3-3' of FIG. 2A.

The configuration of temperature valve seat 200 is shown in FIG. 3. Hot water entering through entry port 90 passes to the valve seat through an oblong slot 330 in the temperature valve housing 210. An identically-shaped opening 350 in the temperature valve 310 is aligned with opening 330 when the volume valve is in an "off" position. This allows any cold water in the hot water line to be run out prior to actuation of the system's automatic temperature adjustments. Oblong slot 360 is the cold water entry port in temperature valve housing 210, and oblong slot 320 is the identically-shaped opening in the temperature valve 310. The port positions shown are for hot water on full, with cold water being completely shut off. Rotating the temperature control valve 310 clockwise, as shown in FIG. 3, gradually closes the hot water port 350 and opens the cold water port 320, thus mixing water respectively admitted by both ports in a ratio determined by the angular position of the valve. The valve is rotated about its shaft 250. Rotating a full 75 degrees fully opens the cold water port 320 and closes the hot water port 350 completely, the port 350 in that position being totally disaligned from the slot 330 in the hot water conduit.

With reference once again to FIGS. 2 and 2A, shown therein is means coupled to the first valve member for detecting when the first valve member assumes a predetermined angular position. In the illustrated embodiment, this means comprises a magnetic switch 390 actuated by a permanent magnet 385 when the first valve member assumes the predetermined position. The indication thus produced is used to initialize the valve position after any interruption in the system's tracking of valve position. Such may occur after a power outage, or when the system is shut down. It will be apparent to one having ordinary skill in the art that means mechanically or optically sensing when the first valve element assumes a predetermined position could be used in this application instead of the magnetic means described above.

Figure 4:
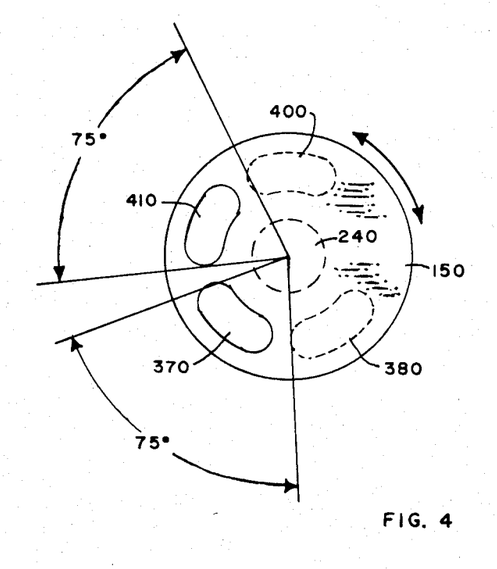
FIG. 4 shows a volume rate valve and seat configuration of the valve illustrated in FIG. 2 in a view taken along line 4-4' of FIG. 2A.

FIG. 4 illustrates the valve seat configuration 220 of the volume valve 150. Water passes through the connecting tube 170 as described above and into the conduits of the volume valve 150. With the auxiliary exit port 140 capped off, as shown in FIG. 1, water flows only through shower or primary exit port 130. The volume valve as shown in FIG. 4 is in the "off" position for both the primary and auxiliary outlets 130 and 140, respectively. As the volume rate valve is gradually turned clockwise, as shown in FIG. 4, water in conduit 410 of valve 150 will flow through partially-aligned port 400 in volume housing 230 and out primary water outlet port 130. Rotation a full 75 degrees clockwise would align ports 410 and 400 and open the conduit 410 completely. Reversing the rotation would again, of course, close the valve. If the auxiliary outlet 140 were to be used, ports 370 and 380 would control the volume rate of discharge, with partial or complete alignment of the ports 370 and 380 controlling the volume rate of the water directed for example, into a tub, depending on the degree of counterclockwise rotation of the valve through a shaft 240.

Again, a volume rate valve angular position detection means in the form of a magnetic switch 395 and permanent magnet 385 are provided to initialize the angular position of the volume valve 150 if necessary. These means may also comprise a mechanical or optical switch instead of a magnetic switch, with appropriate means cooperating therewith to provide an indication when the valve assumes its predetermined position.

Figure 5:
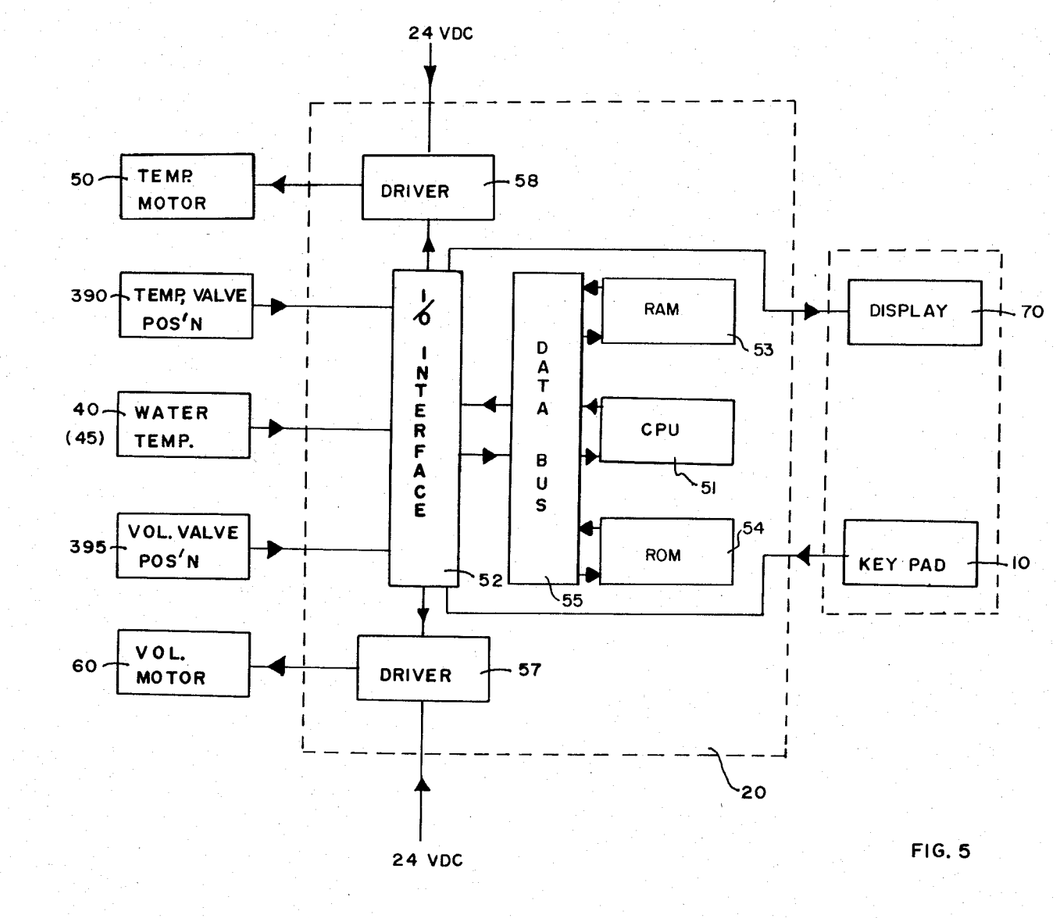
FIG. 5 is a functional block diagram of control unit 2 shown in FIG. 1.

FIG. 5 is a functional block diagram showing control signals and the arrangement of electric elements used in the system according to the present invention. Keypad 10, temperature stepper motor 50, volume rate stepper motor 60, water temperature sensor 40 are all represented in FIG. 5 as functional block elements. Angular position sensors 390 and 395 are also represented as functional block elements. Elements collectively corresponding to control unit 20 are enclosed within a phantom box. As seen in FIG. 5, control unit 20 preferably comprises conventional circuitry including a central processing unit or CPU 51 which communicates with an input/output interface 52 random access memory (RAM) 53, and read only memory (ROM) 54 through a data bus 55. CPU 51 may be any conventional microprocessor. In the presently preferred embodiment, the industry-standard 280 microprocessor from ZiLog is used. The input/output interface 52 is arranged to receive data signals from keypad 10 indicating a desired temperature and volume rate, as well as an actual water temperature from water temperature sensor 40 and, optionally, angular position signals from angular position sensors 390 and 395. This information is then operated on by CPU 51 according to a control program stored in ROM 54. RAM 53 is provided to store certain combinations of set temperatures and volume rates together with the designation identifying a particular user so the particular user may readily recall those particular settings when desired. CPU 51 then generates appropriate signals for control which are output by the input/output interface to drivers 57 and 58 which respectively control the temperature stepper motor 50 and volume rate stepper motor 60. Drivers 57 and 58 may simply be analog switches for connecting respective motors to the 12 or 24 volt line with the proper polarity to induce rotation in the proper direction, or maybe more sophisticated devices, depending on the degree of control desired considered together with system cost. Such drivers are commercially available. For example, a 28420A driver chip manufactured by ZiLog may be used. It is also possible to eliminate these chips entirely, and to simply place a program in ROM which will cause CPU 51 directly to provide the desired control signals. CPU 51 also develops signals for display in display 70, which, as mentioned above, may be provided on keypad 10, as will be developed below.

Figure 6:
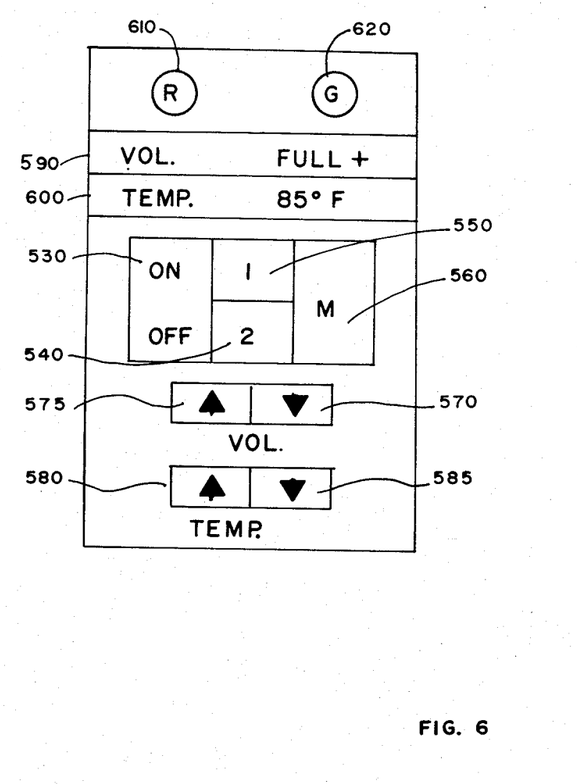
FIG. 6 is a front view of a keypad 10 shown in FIG. 1.

FIG. 6 shows a possible keypad configuration for displaying the status and effecting control of the system. Components for a keypad such as keypad 10 are available, for example, from C & K Grafton Company and Canyon Electronics, with modifications being made to accommodate the specific requirements of the present system. An on-off switch 530 is depressed to actuate the system. (If a preset volume and temperature have been placed in memory, switch 550 or 540 may alternatively serve as on-off switches.) Initial adjustment for volume and temperature is made with switches 570, 575, and 580, 585, respectively. When the desired volume and temperature are reached, switch 550 or 540 is pressed, and then switch 560. This causes CPU 51 to store the selected settings. If the same user wishes to recall these settings at a later occasion, he may do so by sequentially pressing switches 530 and 550, or 530 and 540. Digital display 70, in the preferred embodiment, comprises digital readouts 590 for the volume rate and 600 for the temperature at any moment. When a recalled set temperature is reached, a green light 620 may be illuminated so that the user can enter the shower knowing what the water temperature is. If water temperature adjustments are impossible, for example, when the supply of hot water has been exhausted, a red light 610 may be illuminated. In other words, the circuit would detect that the desired fluid temperature is beyond the range which can be reached through adjustment.

CPU may also be programmed to perform additional functions. For example, the CPU may be provided with a program, in ROM 54, for controlling the maximum temperature that effluent water may attain. Such "scald protection" circuitry would be triggered to shut the volume control valve off when a signal from either temperature sensor reaches a preprogrammed limit.

Figure 7A:
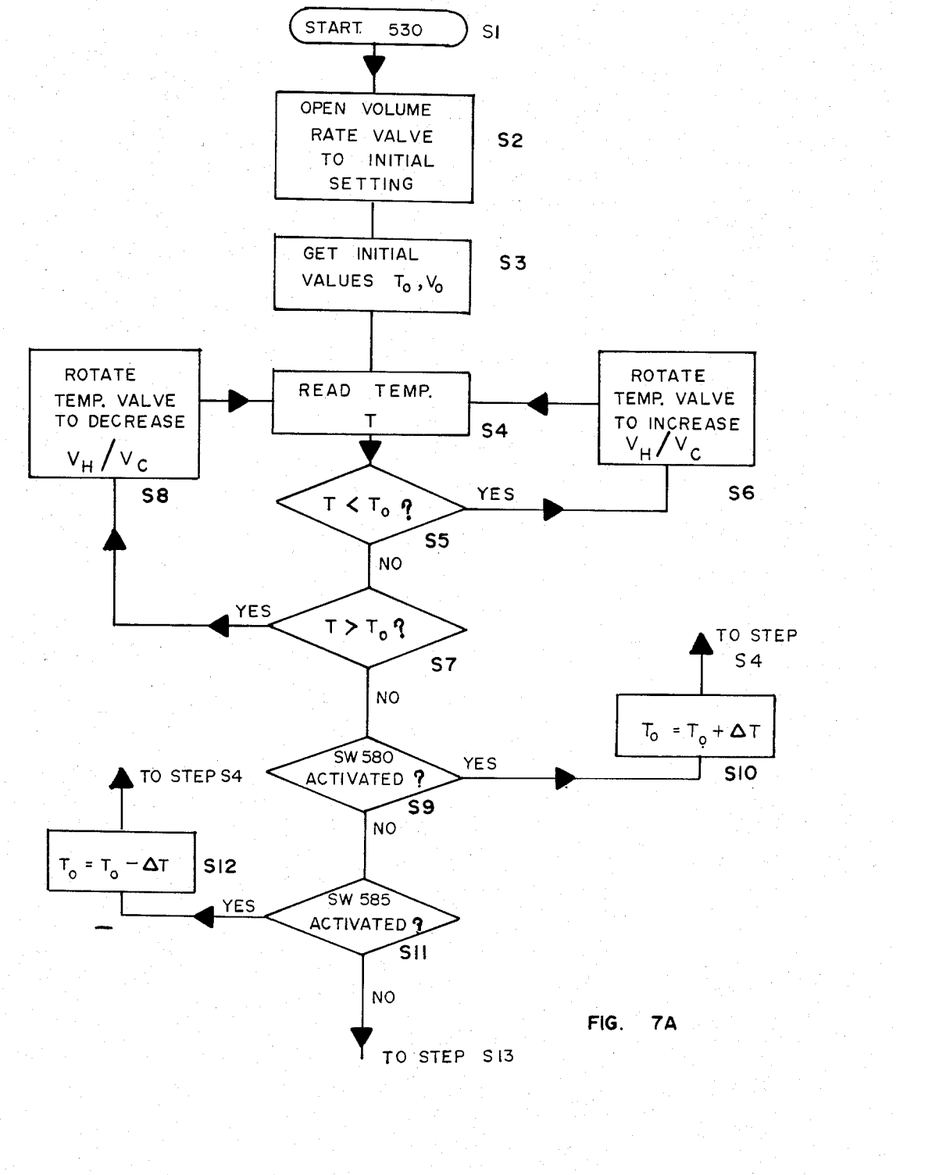
FIGS. 7A and 7B together comprise a flowchart showing an operational sequence for the system according to the present invention.
Figure 7B:
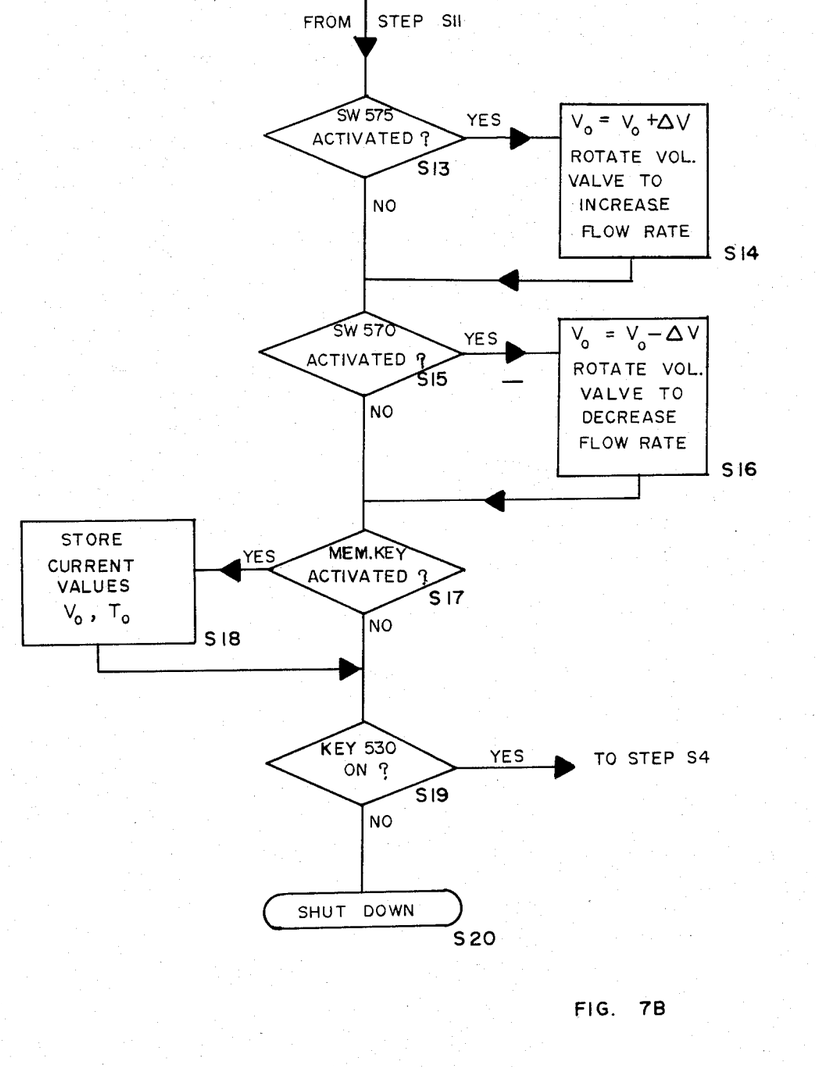

FIGS. 7a and 7b together comprise a flowchart as an aid to understanding a preferred operational sequence for CPU 51. In step S1, system operation is initiated by depressing switch 530. The system responds in step S2 by opening the volume rate valve to an initial setting. The system would then get initial valves T0 and V0 from memory, or input from keypad 10. The CPU would then obtain the actual temperature from sensor 40 through input/output interface 52 in step S4. In step S5, the CPU would determine whether the read temperature T is less than the initial value T0. If it is, then in step S6, the CPU would effect rotation of the temperature valve to increase the ratio of the volume of hot water to cold water. Execution would then return to step S4. If the temperature read in step S4 is not less than the initial temperature value, execution proceeds to step S7, wherein it is determined whether the read temperature T is greater than the initial set temperature T0. If it is, execution proceeds to step S8 wherein the CPU effects rotation of the temperature valve to decrease the ratio of the volume of hot water to the volume of cold water, and then returns execution to step S4. If it is determined in step S7 that the actual temperature is not greater than the initial value, then operation proceeds to step S9.

In step S9, it is determined whether switch 580, the switch the user would activate to raise the temperature of water, has been activated. If it has, then the set temperature is increased by a predetermined amount, for example, 5° F. Execution would then return to step S4. If it is determined in step S9 that switch 580 has not been activated, then in step S11, it is determined whether switch 585 has been activated. Switch 585 is the switch a user would activate to decrease the temperature of water. If switch 585 has been activated, then the set temperature is decreased by a predetermined amount, for example, 5° F., and excution returns to step S4. If the CPU 51 determines that switch 585 has not been activated, then execution proceeds to step S13.

In step S13, it is determined whether switch 575, the switch a user would manipulate on keyboard 10 in order to increase the volume rate of water flowing, has been activated. If it has, then the CPU effects rotation of volume valve motor 60 to increase the flow rate in step S14. The set volume flow rate may also be increased by a predetermined amount, for example, a tenth of a gallon per minute. After this, or if it is determined in step S13 the switch 575 has not been activated, execution proceeds to step S15. In step S15 it is determined whether switch 570, the switch a user would manipulate to decrease the flow rate of water exiting from the shower head, has been activated. If switch 570 has been activated, then CPU 51, in step S16, effects rotation of the volume valve to decrease the flow rate. The set volume rate may also be decreased by a predetermined amount. After step S16, or if it is determined in step S15 that switch 570 has not been activated, the CPU executes step S17, wherein it determined whether the memory key has been activated. If memory key 560 has been activated, then the CPU stores the then-current set values T0 and V0. If key 560 has not been activated, or after effecting storage of the new set values, the CPU determines in step S19 whether key 530, the system on key, is still on. If it is on, then execution loops back to step S4. If it is not on, then the system shuts down. Shut down procedures typically include rotating the volume valve to shut off the flow of water through the system.

The foregoing flowchart assumes a system in which volume and temperature valve angular position detection signals are not developed and not used. If it is determined that system design characteristics require the inclusion of such signals, then CPU 51 may be programmed to take note of those signals and use them to calculate an actual position of each valve member. This would prove useful, for example, if it is desired reliably to return the valve elements to a known position as part of a given procedure, i.e., to initialize their positions, or to "park" them at a known position as part of a shut down procedure so that the position of the valve elements may be assumed at the start of the next procedure.

Figure 8:
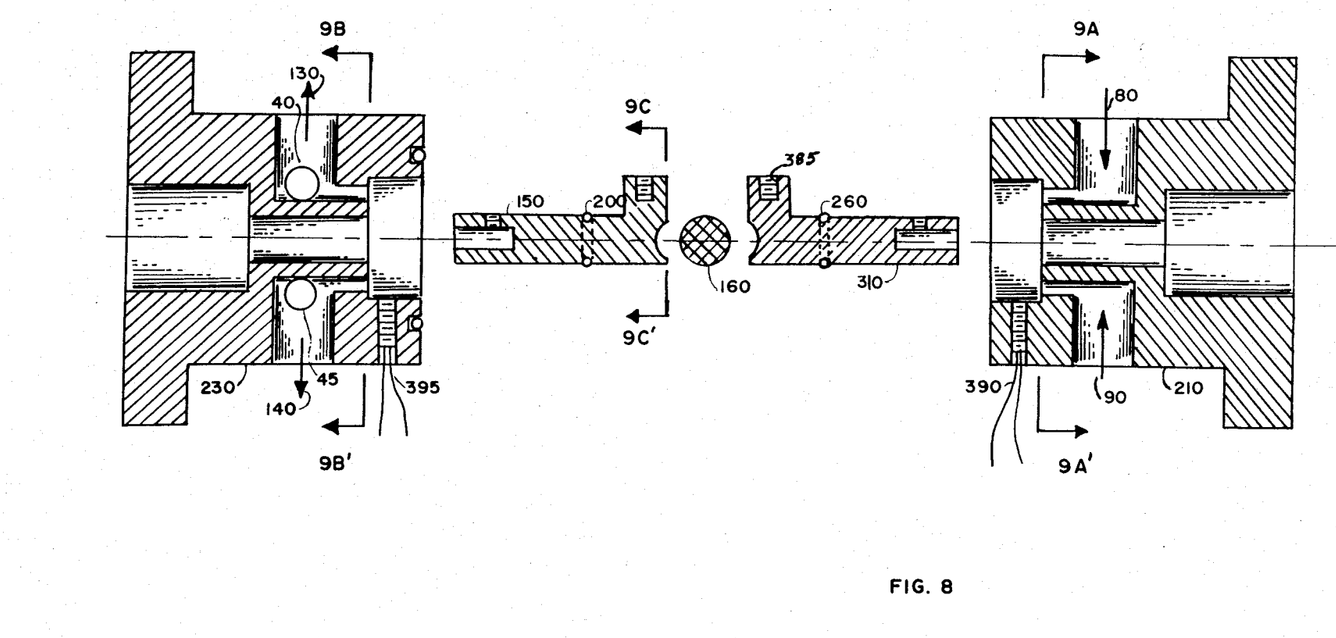
FIG. 8 shows an exploded sectional view of a second embodiment of a control valve for the system of the present invention.

FIG. 8 discloses an alternative embodiment of control valve 70 which could be used in the present system.

Figure 9A:
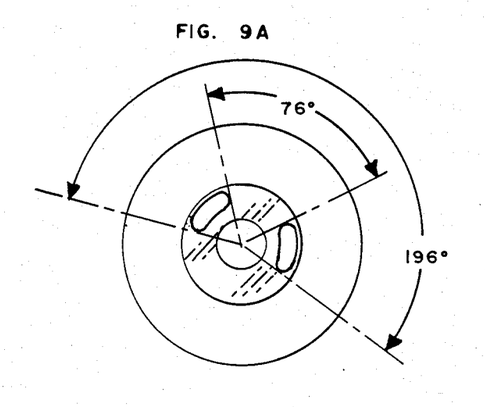
FIG. 9A shows a view of a temperature valve element and valve seat for the control valve taken along line 9A-9A' of FIG. 8.
Figure 9B:
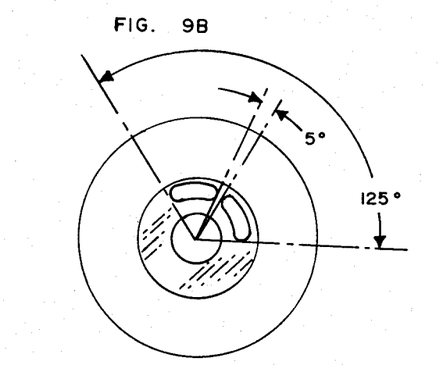
FIG. 9B shows a view of a volume rate control element and valve seat for the control valve taken along line 9B-9B' of FIG. 8.
Figure 9C:
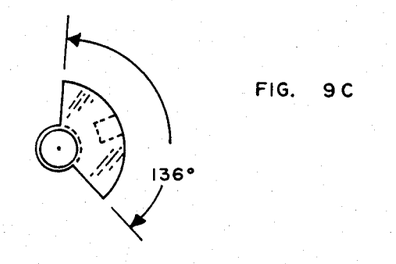
FIG. 9C shows a view of a valve element taken along line 9C-9C' of FIG. 8.

The control valve of FIG. 8 resembles that of FIG. 2 in that the valve halves 150 and 310 are stil substantially the same as each other. There are, however, no internal openings for the passage of a fluid through the center of the valve elements. Instead, as shown in the sectional inset views, the mixing chamber consists of a 224 degree cut from each valve (see FIG. 9C) plus the spacing between the opposed faces of the two valves. FIGS. 9A-9C show the temperature valve and seat configuration, volume valve seat configuration and valve element configuration. The details of construction of the first two of these components are substantially identical to those of FIGS. 3 and 4. Therefore, further explanation of those details will be omitted for the sake of brevity. The embodiment of the valve shown in FIG. 8 has the advantage that water pressure on the valve face, pushing the valve against the valve seat, is small and thus allows elimination of a connecting tube 170 and both "O" rings 270. The round rubber or teflon spring 160 of FIG. 8 replaces the coil steel spring 160 of FIG. 2A and both washers 180. An additional advantage lies in the simplified machining of both valves where there are no valve openings, nor compound angles for their openings.

It is contemplated that the invention will find primary utility in controlling the temperature and volume rate of discharge of water from a shower head or faucet in the bathtub. Other useful applications, however, are many. Also, many modifications can be made to the equipment and operational sequence disclosed above. For example, the conduit configuration of an oblong slot can be changed to a longer and thinner slot having the same or different cross sectional area. The invention should therefore not be regarded as limited to such modifiable details of construction. The scope of protection for the invention should instead be regarded as being fully commensurate with the following claims.

What is claimed is:

1. An apparatus for a system including a source of cold water under pressure, a source of hot water under pressure, and a water outlet, for controlling the temperature and volume rate of discharge of water flowing out of said water outlet, said apparatus comprising:

data entry means for entering volume rate data indicating a desired volume rate and for entering temperature data indicating a desired temperature;

temperature sensing means for sensing the temperature of said flowing water and for producing a measured temperature signal indicative of the sensed temperature;

control means, responsive to said data entry means and said temperature sensing means, for producing a volume rate control signal in accordance with said volume rate data, and for producing a temperature control signal in accordance with said temperature data and said measured temperature signal;

a control valve means including a cold water port adapted to be connectable to said source of cold water under pressure, a hot water port adapted to be connectable to said source of hot water under pressure, and an outlet port adapted to be connectable to said water outlet, and connected to said control means, for mixing said hot and cold water in a predetermined ratio to form mixed water having said desired temperature in response to said temperature control signal and for permitting said mixed water to flow through said outlet port at a predetermined volume rate corresponding to said desired volume rate in response to said volume rate control signal, said control valve means comprising a mixing chamber; a first valve member in fluid communication with said hot water port, said cold water, and said mixing chamber, and arranged to admit hot water from said hot water port and cold water from said cold water port into said mixing chamber in said predetermined volume ratio according to an angular position of said first valve member; a first stepper motor responsively connected to said control means and mechanically coupled to said first valve member to control the angular position of said first valve member in accordance with said temperature control signal; a second valve member in fluid communication with said outlet port and said mixing chamber, and arranged to permit water mixed in said mixing chamber to flow from said mixing chamber to said outlet port at said predetermined volume rate according to an angular position of said second valve member; and a second stepper motor responsively connected to said control means and mechanically coupled to said second valve member to control the angular position of said second valve member in accordance with said volume rate control signal;

first means coupled to said first valve member for sensing the angular position of said first valve member and generating a first angular position signal indicative of the sensed angular position of said first valve member; and second means coupled to said second valve member for sensing the angular position of said second valve member and generating a second angular position signal indicative of the sensed angular position of said second valve member, wherein said control means produces said temperature control signal further in accordance with said first sensed angular position and produces said volume rate control signal further in accordance with said second sensed angular position.

2. The apparatus of claim 1, wherein said first and second angular positions correspond to initializing positions.

3. The method of claim 2, wherein said predetermined amounts of said hot and cold water and said predetermined volume rate are attained by rotating said first and second valves in response to said temperature and volume rate control signals, respectively.

4. The method of claim 3, wherein said method includes the step of rotating said first and second valves to initializing positions prior to said mixing in step (f).

5. An apparatus for a system including a source of a first fluid under pressure at a first temperature, a source of a second fluid under pressure at a second temperature different from the first temperature, and a fluid outlet, for controlling the temperature and volume rate of discharge of a mixed fluid, formed by mixing said first fluid and said second fluid, flowing out of said fluid outlet, said apparatus comprising:

data entry means for entering volume rate data indicating a desired volume rate and for entering temperature data indicating a desired temperature;

temperature means for sensing the temperature of the mixed fluid, and for producing a measured temperature signal indicative of the sensed temperature;

control means, responsive to said data entry means and said temperature sensing means, for producing a volume rate control signal in accordance with said volume rate data and for producing a temperature control signal in accordance with said temperature data and said measured temperature signal; and a control valve means including a first fluid port adapted to be connectable to said first fluid source, a second fluid port adapted to be connectable to said second fluid source, and an outlet port adapted to be connectable to said fluid outlet, for mixing said first fluid and said second fluid in a predetermined volume ratio to form said mixed fluid having said desired temperature in response to said temperature control signal, and for admitting said mixed fluid to flow through said fluid outlet port at a predetermined volume rate corresponding to said desired volume rate in response to said volume rate control signal, said control valve means comprising a mixing chamber; a first valve member in fluid communication with said first fluid port, said second fluid port, and said mixing chamber and arranged to admit said first fluid from said first fluid port and said second fluid from said second fluid port into said mixing chamber in said predetermined volume ratio according to an angular position of said first valve member; a first stepper motor responsively connected to said control means and mechanically coupled to said first valve member to control the angular position of said first valve member in accordance with said temperature control signal; a second valve member in fluid communication with said outlet port and said mixing chamber, and arranged to permit the mixed fluid mixed in said mixing chamber to flow from said mixing chamber to said outlet port at said predetermined volume rate according to an angular position of said second valve member; a second stepper motor responsively connected to said control means and mechanically coupled to said second valve member to control the angular position of said second valve member in accordance with said volume rate control signal, wherein said first and second valve members are arranged in opposing relationship in a single valve housing, each of said valves having a valve seat, and wherein said control valve means further includes means for holding each of said valves against a respective said valve seat, said holding means including a single resilient holding element for engagement with both said valve seats.

6. The apparatus of claim 5, wherein said mixing chamber is disposed in said valve housing between and around said opposing valves.

7. An apparatus for a system including a source of a first fluid under pressure at a first temperature, a source of a second fluid under pressure at a second temperature different from the first temperature, and a fluid outlet, for controlling the temperature and volume rate of discharge of a mixed fluid, formed by mixing said first fluid and said second fluid, flowing out of said fluid outlet, said apparatus comprising:

data entry means for entering volume rate data indicating a desired volume rate and for entering temperature data indicating a desired temperature;

temperature means for sensing the temperature of the mixed fluid, and for producing a measured temperature signal indicative of the sensed temperature;

control means, responsive to said data entry means and said temperature sensing means, for producing a volume rate control signal in accordance with said volume rate data and for producing a temperature control signal in accordance with said temperature data and said measured temperature signal; and a control valve means including a first fluid port adapted to be connectable to said first fluid source, a second fluid port adapted to be connectable to said second fluid source, and an outlet port adapted to be connectable to said fluid outlet, for mixing said first fluid and said second fluid in a predetermined volume ratio to form said mixed fluid having said desired temperature in response to said temperature control signal, and for admitting said mixed fluid to flow through said fluid outlet port at a predetermined volume rate corresponding to said desired volume rate in response to said volume rate control signal, said control valve means comprising a mixing chamber; a first valve member in fluid communication with said first fluid port, said second fluid port, and said mixing chamber and arranged to admit said first fluid from said first fluid port and said second fluid from said second fluid port into said mixing chamber in said predetermined volume ratio according to an angular position of said first valve member; a first stepper motor responsively connected to said control means and mechanically coupled to said first valve member to control the angular position of said first valve member in accordance with said temperature control signal; a second valve member in fluid communication with said outlet port and said mixing chamber, and arranged to permit the mixed fluid mixed in said mixing chamber to flow from said mixing chamber to said outlet port at said predetermined volume rate according to an angular position of said second valve member; a second stepper motor responsively connected to said control means and mechanically coupled to said second valve member to control the angular position of said second valve member in accordance with said volume rate control signal, and wherein said angular positions of said first and second valve members provide variable registration of said fluid ports and said outlet port with said first and second fluid sources and said fluid outlet, respectively.

8. The apparatus of claim 7, wherein said first and second fluid ports and said outlet port each comprise an oblong slot.

* * * * *